(12) United States Patent
Benedikt et al.

(10) Patent No.: US 7,716,322 B2
(45) Date of Patent: May 11, 2010

(54) AUTOMATIC EXPLORATION AND TESTING OF DYNAMIC WEB SITES

(75) Inventors: Michael Abraham Benedikt, Chicago, IL (US); Juliana Freire Silva, Portland, OR (US); Patrice Ismael Godefroid, Naperville, IL (US); Avinash Vyas, North Plainfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2229 days.

(21) Appl. No.: 10/252,210

(22) Filed: Sep. 23, 2002

(65) Prior Publication Data

US 2004/0059809 A1    Mar. 25, 2004

(51) Int. Cl.
*G06F 15/173* (2006.01)
*G06F 15/16* (2006.01)
*G06F 17/00* (2006.01)
*G06F 17/27* (2006.01)

(52) U.S. Cl. .................. 709/224; 709/217; 715/224; 715/226

(58) Field of Classification Search .................. 709/224, 709/217; 715/224, 226
See application file for complete search history.

(56) References Cited

U.S. PATENT DOCUMENTS 5,974,455 A * 10/1999 Monier ...................... 709/223
6,199,079 B1 * 3/2001 Gupta et al. ................ 715/507
6,665,658 B1 * 12/2003 DaCosta et al. .............. 707/3
6,954,901 B1 * 10/2005 Desai et al. ................. 715/745
2002/0056053 A1 * 5/2002 Vine et al. ..................... 714/4

OTHER PUBLICATIONS

Raghavan, Sriram et al., "Crawling the Hidden Web", Dec. 2000, pp. 1-25.*
"Rational Robot", http://www.rational.com/products/robot, 2002, pp. 1-2.*
"Watchfire WebQA Factsheet" http://www.watchfire.com/resources/webqa-overview.pdf, 2002, pp. 1-4.*
"Rational Robot", http://www.rational.com/products/robot, 2001, pp. 1-2.*
Benedikt, Michael, "Automated Web Site Testing", http://www-db-out.bell-labs.com/user/benedikt/veriweb.html, Jul. 3, 2001.*
Raghavan, Sriram et al., "Crawling The Hidden Web", http://dbpubs.stanford.edu:8090/pub/showDoc.Fulltext?lang=en&doc=2000-36&format=pdf&compression=, Dec. 2000, pp. 1-25.

(Continued)

*Primary Examiner*—Larry Donaghue
*Assistant Examiner*—Brian J Gillis
(74) *Attorney, Agent, or Firm*—Ryan, Mason & Lewis, LLP

(57) ABSTRACT

A unique tool, i.e., "VeriWeb", is employed to automatically discover and systematically explore Web-site execution paths that can be followed by a user in a Web application. Unlike traditional spiders (or crawlers) that are limited to the exploration of static links, VeriWeb can navigate automatically through dynamic components of Web sites, including form submissions and execution of client-side scripts. Whenever examining a new Web page, the system determines all possible actions a user might perform—be it a link, via a button with a JavaScript handler, or via form submission—and can execute them in a systematic way. In order to systematically test different paths in a Web site, VeriWeb addresses two critical problems: systematic Web site exploration and automatically filling out forms.

4 Claims, 7 Drawing Sheets

OTHER PUBLICATIONS e-TESTER™, "Push-Button Functional and Regression Testing for Browser-Based Applications", http://www.rswsoftware.com/products/e-Tester.pdf, pp. 1-2, 2000.

RSWSoftware, e-Tester™, "Push-Button Functional and Regression Testing for Browser-based Applications", http://www.rswsoftware.com/products/etester_index.shtml, p. 1-3, 2000.

Test Smarter, Finish Faster, "Rational® Robot", http://www.rational.com/media/products/robot/D323_Robot.pdf, pp. 1-2, 2001.

"Rational® Robot", http://www.rational.com./products/robot/index.jsp, pp. 1-2, 2002.

Segue solutions, "silktest automated functional and regressive testing", http://www.segue.com/html/s_solutions/s_silktest/_s_silktest_toc.htm, pp. 1, 2002.

"Silktest", http://www.segue.com/html/s_solutions/pdf/silktest/pdf, pp. 1-2, 2002.

Watchfire, "Watchfire® WebQA™", http://www.watchfire.com/products/webqa.asp?PrinterFriendly=PrinterFriendly&, pp. 1,2002.

Watchfire, "WEBQA Factsheet", http://www.watchfire.com/resources/webqa-overview.pdf, pp. 1-4, 2002.

* cited by examiner

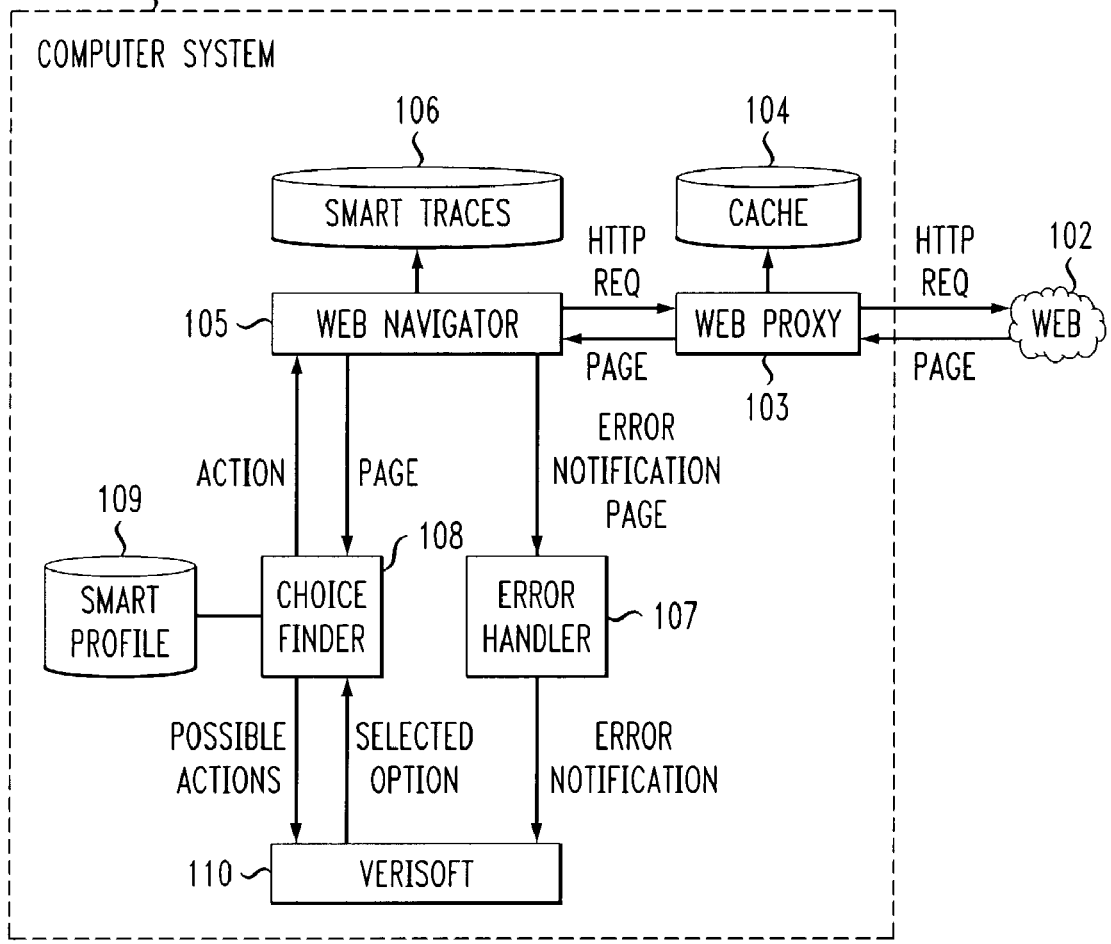

FIG. 2b

```
<FORM action="/display/automobiles" method=get>
    <INPUT type=hidden value=table name=ct_hft>
    <INPUT type=hidden name=intl value="us">
    <B>Keyword (s) : </B>
    <INPUT maxLength=50 size=15 name=ck> (e.g. red mustang)
    <input type=hidden name="cr" value="New York City">

<B>Price:</B>
    From $ <SELECT name=cl_price>
                    <OPTION value=" " selected>Any
                    <OPTION value=1000>1,000
                    <OPTION value=2000>2,000
                    ............................
                    <OPTION value=50000>50,000</OPTION>
            </SELECT>
    to $   <SELECT name=ch_price>
                    <OPTION value=" " selected>Any
                    <OPTION value=1000>1,000
                    ............................
                    <OPTION value=50000>50,000</OPTION>
            </SELECT>
    <B>Sale Type:</B>
            <SELECT name="ce_sl">
                    <OPTION value=" " selected>No Preference
                    <OPTION value="By Owner">By Owner
                    <OPTION value="Used By Dealer">Used By Dealer
                    <OPTION value="New By Dealer">New By Dealer</OPTION>
            </Select>
    <INPUT type=submit value=Search> 
        <A href="/display/automobiles?cc=automobiles&ct_hft=advsearch&
nodeid=750000268&cr=New+York+City">More Options...</A>

<INPUT type=hidden value=automobiles name=cc>
    <INPUT type=hidden value=1 name=cf>
    <Input type=hidden value="750000268" name="fullnodeid">
</FORM>
```

FIG. 3

```
< !DOCTYPE smartprofile [
    < !ELEMENT smartprofile  (signature* | profile*) >

< !ELEMENT signature  (name, field+) >
    < !ELEMENT field  (name, synonym) >
    < !ATTLIST field key CDATA>

< !ELEMENT profile  (name, signature, fieldvalue+) >
    < !ELEMENT fieldvalue  (name, regaxp) >

< !ELEMENT regexp  (#PCDATA) >

< !ELEMENT name  (#PCDATA) >
    < !ELEMENT synonym  (#PCDATA) >

```
<signature>
    <name> CarType </name>
    <field key="true">
        <name> Make </name>
        <synonym> *carmake* </synonym>
    </field>
    <field key="false">
        <name> Model </name>
    </field>
    <field key="false">
        <name> Year </name>
    </field>
    <field key="false">
        <name> Interior </name>
    </field>
    <field key="false">
        <name> Type </name>
    </field>
</signature>
```

FIG. 4B

```
<profile>
    <name> HondaCivicSedan </name>
    <signature> CarType </signature>
    <fieldvalue>
        <name> Make </name>
        <regexp> Honda </regexp>
    </fieldvalue>
    <fieldvalue>
        <name> Model </name>
        <regexp> *Civic*Sedan* </regexp>
    </fieldvalue>
    <fieldvalue>
        <name> Year </name>
        <regexp> 1999|2000 </regexp>
    </fieldvalue>
    <fieldvalue>
        <name> Interior </name>
        <regexp> Beige </regexp>
    </fieldvalue>
    <fieldvalue>
        <name> Type </name>
        <regexp> Sedan </regexp>
    </fieldvalue>
</profile>

<profile>
    <name> Rolls </name>
    <signature> CarType </signature>
    <fieldvalue>
        <name> Make </name>
        <regexp> Rolls-Royce </regexp>
    </fieldvalue>
    <fieldvalue>
        <name> Model </name>
        <regexp> *Corniche* </regexp>
    </fieldvalue>
    <fieldvalue>
        <name> Year </name>
        <regexp> 2002 </regexp>
    </fieldvalue>
    <fieldvalue>
        <name> Type </name>
        <regexp> Convertible* </regexp>
    </fieldvalue>
</profile>
```

SELECTING A CHOICE IN THE CURRENT PAGE

DATA STRUCTURES AND INPUTS

BEFORE START:

1. NEW PAGE
2. PROFILES
3. ACTIVE PROFILE LIST

CREATED IN PROCESS:

4. FORM SCHEMA
5. SET OF PARTIAL MATCHES
6. PARTICULAR MATCH
7. SET OF COMPLETIONS OF MATCH
8. PARTICULAR FORM COMPLETION

AUTOMATIC EXPLORATION AND TESTING OF DYNAMIC WEB SITES

TECHNICAL FIELD

This invention relates to the World Wide Web (WWW) and, more particularly, to the automatic exploration and testing of dynamic Web sites.

BACKGROUND OF THE INVENTION

As more and more services and information are made available over the Internet and intranets, Web sites have become extraordinarily complex, while their correctness is often crucial to the success of businesses and organizations. Although traditional software testing is already a notoriously hard, time-consuming and expensive process, Web-site testing presents even greater challenges. Indeed, unlike traditional GUIs (graphical user interfaces), Web interfaces are very dynamic. Web pages are modified frequently: adding links, making user-specific customizations (some pages change every time they are requested), adding new features, or changing a site look-and-feel. Moreover, the environment of Web applications is more complex than that of typical monolithic or client-server applications—Web applications interact with many components, such as CGI (common gateway interface) scripts, browsers, backend databases, proxy servers, etc., which may increase the risk of interoperability issues. Furthermore, many Web applications have a large number of users with no training on how to use the application—they are likely to exercise it in unpredictable ways. Therefore, Web sites that are critical to business operations of an organization should be tested thoroughly and frequently.

Static components of Web sites can be automatically tested by existing spider-like programs (or Web crawlers), which recursively follow all possible static links from a Web page in search of errors such as broken links, misspellings, and HTML (hypertext markup language)—conformance violations. For automatically testing dynamic components, which include execution of so-called client-side scripts and form interactions, the only class of tools currently available are "capture-replay" tools that record specific user-defined testing scenarios, and then generate scripts (sequences of browsers actions) that can be run on browsers in order to automatically replay the recorded scenarios for regression testing. Because Web sites are increasingly complex, manually recording a sample set of testing scenarios with a capture-replay tool can be very time-consuming. Due to the impossibility of recording more than a few possible paths, site coverage using capture-replay tools ends up being typically limited to a small portion of the Web-site functionality. Moreover, although state-of-the-art capture-replay tools do provide some level of abstraction when recording user actions and increased portability of test scenarios (for instance, by recording general browser actions instead of mouse actions on specific screen coordinates), changes in the structure of a Web site may prevent previously recorded test scenarios from being replayed and, hence, may require re-generating and re-recording a new set of test scenarios from scratch.

SUMMARY OF THE INVENTION

These and other problems and limitations of prior known Web site testing tools are overcome by employing a unique tool (hereinafter "VeriWeb") that automatically discovers and systematically explores Web-site execution paths that can be followed by a user in a Web application. Unlike traditional spiders (or crawlers) that are limited to the exploration of static links, VeriWeb can navigate automatically through dynamic components of Web sites, including form submissions and execution of client-side scripts. Whenever examining a new Web page, the system determines all possible actions a user might perform—be it a link, via a button with a JavaScript handler, or via form submission—and can execute them in a systematic way. In order to systematically test different paths in a Web site, VeriWeb addresses two critical problems: systematic Web site exploration and automatically filling out forms.

When forms are encountered, VeriWeb uses SmartProfiles to identify values that should be input to forms. Loosely speaking, user-specified SmartProfiles represent sets of attribute-value pairs that are used to automatically populate forms. An important feature of SmartProfiles is that they are specified independently of the structure of the Web site being tested.

Since Web sites can have an extremely large number of possible paths, Web-site exploration (and path discovery) must be performed in a systematic way so as to guarantee that a significant portion of the site is covered. Different exploration methods are possible. In an embodiment of the invention, the exploration is performed under the control of a prior known tool (hereinafter "VeriSoft") in conjunction with VeriWeb to systematically explore the state space (i.e., the paths in the site).

VeriWeb, like a Web crawler, recursively crawls through Web pages. Starting from a pre-specified URL (Uniform Resource Locator), VeriWeb discovers the set of possible actions a user can perform while interacting with that page. The VeriSoft component records this set of actions, and selects one of them for execution. If a new page is retrieved as a result of executing the selected action, the process is repeated on the next page. Since VeriSoft records, i.e., stores, the sequence of actions, it keeps track of the states that have been explored and is able to detect when a pre-specified depth in the state space (i.e., number of successive actions) is reached. When a pre-specified "depth" is reached, or when an error is detected, VeriSoft re-initializes the exploration and starts executing a new scenario from the initial state (the starting URL). By repeating this process, all possible execution paths of a Web application up to the given depth can eventually be exercised and checked.

Since the state space of a Web site can be very large in practice, VeriWeb supports various techniques and heuristics to limit the size of the part of the state space being searched. During Web-site exploration, VeriWeb allows checking for many different types of errors, from errors in an isolated Web page (e.g., the presence of a string pattern for an error, conformance to accessibility guidelines), to errors that involve a navigation path (e.g., constraints on length of the deepest paths in the site).

An important feature of VeriWeb is that different error-checking components can be easily plugged into the system.

Whenever an error is detected, the execution path leading to the error is saved and can be replayed interactively for debugging purposes. VeriWeb thus combines the flexible navigation capabilities of capture-replay tools with the high level of automation provided by Web crawlers. Note that the functionality provided by VeriWeb is complementary to that of capture-replay tools—whereas capture-replay tools are useful for testing the functionality of a few critical paths in the application, VeriWeb exhaustively explores and tests a large number of execution paths that may result from unpredictable user behavior.

BRIEF DESCRIPTION OF THE DRAWING

FIG. 1 illustrates, in simplified block diagram form, details the VeriWeb architecture, including an embodiment of the invention;

FIG. 2A shows a graphical representation of an automobile classified form and FIG. 2B shows the HTML fragment used to define the form;

FIG. 3 illustrates a DTD (Document Type Definition) for a signature and profile;

FIGS. 4A and 4B show a signature and profiles for an automobile example;

DETAILED DESCRIPTION

Figures 5A, 5B:
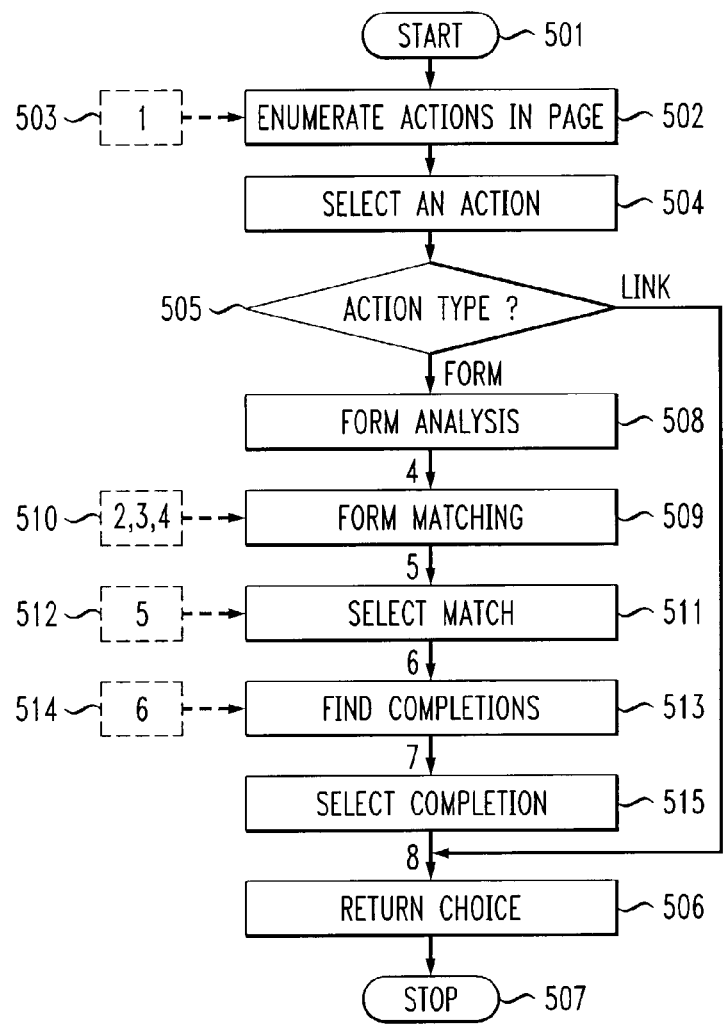
FIG. 5A is a flowchart illustrating steps performed in order to select a choice in a given page, in accordance with the invention
FIG. 5B shows data structures and inputs to the flowchart of FIG. 5A.

FIG. 1 illustrates, in simplified block diagram form, details of the VeriWeb architecture, including an embodiment of the invention. VeriWeb is included as an application on computer system 101, which interfaces with the Web 102 (or any computer system that serves Web pages) to test Web sites. VeriWeb automatically discovers and systematically tests all execution paths that can be followed by a user in a Web application. Indeed, unlike traditional crawlers which are limited to testing static links, VeriWeb automatically navigates through dynamic components of Web sites including, for example, form submissions and execution of client-side JavaScript. The VeriWeb architecture in computer system 101 includes Web Proxy 103 and associated Cache memory 104 for interfacing between Web 102 and Web Navigator 105. Specifically, Web proxy 103 intercepts HTTP (Hypertext Transfer Protocol) requests from the Web Navigator 105 and HTTP requests to Web 102 to obtain Web pages that are stored in Cache 104 for later use and that are also returned to the Web Navigator 105. Web Navigator 105 and associated Smart-Traces repository 106 interact with both Error Handler 107 and Choice Finder 108 along with its associated Smart Profiles repository 109. Both Error Handler 107 and Choice Finder 108 interact with VeriSoft 110. These components and their functions are all described below.

Searching

The objective of the search in VeriWeb is to exercise all possible execution paths a user might follow in a Web site. The search process is itself divided into two tasks: action discovery and exploration control. These two tasks are performed by the components ChoiceFinder 108 and VeriSoft 110, respectively.

ChoiceFinder

The main function of the ChoiceFinder 108 is to, given a Web page retrieved by the Navigator 105 via Web Proxy 103 from Cache memory 104 or the Web 102, discover all possible actions a user can execute while interacting with that page in a Web browser. These actions include all possible interactions of a user with a given Web page, for example: browsing/navigation actions such as following a link and filling out and submitting a form, as well as clicking on a button, selecting an item in a pull-down list or the like.

In one embodiment of this invention, the discovery of these actions is done by traversing the DOM (Document Object Model) representation of the Web page (including any frames and layers that compose the page) and identifying "active" elements (links, forms, buttons, selection lists, etc.) that have associated actions. These actions can be standard actions as defined in the HTML (hypertext markup language) standard, or actions that are defined by Web site designers and connected to page objects through various mechanisms such as client-side scripts (e.g., JavaScript) through the DOM interface. For example:

- the default action associated with clicking on a link is to load the page corresponding to the URL in the link;
- the default action when a user clicks on a submit button is that the browser client builds an HTTP post or get command (as specified in the form) using the attributes and values in the form;
- a user-defined action can be associated with a button which is invoked when the button is clicked (i.e., the action is invoked when the onclick handler for the button fires) or with a selection-list, which is invoked when an item in the list is selected.

Whereas some objects are associated with a single action, others may be associated with multiple actions. In particular, many actions may be associated with a form, depending on how the form is filled in. For instance, consider the Yahoo Auto Classifieds form shown in FIG. 2A and the corresponding HTML fragment in FIG. 2B; there are 23 different possible values for both the FROM and the TO prices (i.e., ANY, 1000, 2000, etc.), 4 values for the SALE TYPE (i.e., No Preference, By Owner, etc.), and a virtually infinite number of possible choices for KEYWORD(S); each possible way to fill up this form may result in a different action.

VeriWeb, more specifically, ChoiceFinder 108, analyzes the content of an HTML page in order to find the set of possible actions from that page. Once an action is selected, it is supplied to Navigator 105 for execution. VeriWeb must address two important and interrelated problems: determining the values to fill in forms and pruning the search space. For form elements such as text fields that do not have an explicit set of possible values defined in the HTML source, values must be provided by the tester. Even when an exhaustive list of possible values is available (e.g., as with selection lists and radio buttons), it may be useful to limit the search space by defining subsets and combinations of values that are thought to be meaningful and representative. The critical problem of how to provide this auxiliary information and use it to guide the search is solved in VeriWeb using SmartProfiles.

SmartProfiles

SmartProfiles provide an abstraction for the data that is needed to fill out the forms in a particular site (or sites). They are described at the level of a data model, not that of forms. We assume that testers are familiar with the structure of the information to be presented through the interface at the level of an end-user's data model. For instance, a tester of a car-sale site will specify a dataset that describes a set of customer profiles, including user-ids and passwords if the site demands them, and car models or properties that a user might be interested in. A tester need not describe the information used to populate fields in a form-by-form manner.

Specifications at the data model level are generally more concise than a form-by-form approach, since Web sites often give alternative methods of entering the same data, and sometimes require the same information to be entered repeatedly in several forms. The model-driven approach also allows the specification to be maintained as a Web site evolves, while a form-based approach is inherently sensitive to the smallest changes in page format. Most importantly, a form-based approach requires the tester to peruse the forms of a site manually whenever the site changes—exactly the kind of time-consuming activity that is to be eliminated from the testing cycle. (Note that, if they choose to do so, testers may also create SmartProfiles in a form-oriented manner.)

There are many different ways to model SmartProfiles. In one embodiment of this invention, a design is chosen that is light-weight, i.e., the tester should not be burdened with a full-fledged data-modeling formalism, and the ability is not provided to specify how often a particular data value can be used in forms, or to explicitly say what combinations of data values can be entered in a particular path. In addition to the obvious motivation in terms of ease-of-use, the granularity of the specification also has a relationship to test coverage. The more dependencies that are specified on the data to be entered via forms, the greater the possibility that the test runs generated will fail to detect error conditions that result from user behavior violating these dependencies.

SmartProfiles are sets of profiles formed from signatures and fields. In the one embodiment of the invention, Smart-Profiles are represented in XML (extensible Markup Lanaguage), other representations are possible. Signatures and fields have the following structure:

```
type Signature =
    signature [ name [ String ],
               Field+
             ]
type Field =
    field [ name [ String ],
            @key [ Boolean ],
            synonym [ String ]?
          ]
```

A signature includes a name that identifies the signature and a list of one or more fields. Each field has a name, an attribute, which indicates whether the field is a key, and optionally a string interpreted as a regular expression and representing synonyms of the name of the field. Keys indicate fields that must be matched in a HTML form for a profile to be applied. Profiles can then be defined from signatures as follows:

```
type Profile =
    profile [ name [ String ],
              signature [ String ],
              FieldValue+
            ]
type FieldValue =
    fieldvalue [ name [ String ],
                 regexp [ String ]
               ]
```

A profile includes a name that identifies the profile, the name of the signature that corresponds to this profile, and a list of FieldValues, which provide values for some of the fields in the signature, including keys. Each FieldValue contains the name of a field defined in the signature, and a specification regexp for the value(s) of that field. The value of regexp is a string interpreted as a regular expression built up from |, *, +. The use of regular expressions both in regexp and synonym allows the specification of a range of possible values for a field or signature name, respectively. FIG. 3 gives a definition of the syntax of signatures and profiles in the form of an XML DTD (extended mark up language document type definition). FIGS. 4A and 4B show examples of a signature and profiles for a Web site selling cars. As shown in FIG. 3 for XML DTD

```
<!DOCTYPE smartprofile [
    <!ELEMENT smartprofile (signature* | profile*)>
    <!ELEMENT signature (name, field+)>
    <!ELEMENT field (name,synonym)>
    <!ATTLIST field key CDATA>
    <!ELEMENT profile (name, signature, fieldvalue+)>
    <!ELEMENT fieldvalue (name,regexp)>
    <!ELEMENT regexp (#PCDATA)>
    <!ELEMENT name (#PCDATA)>
    <!ELEMENT synonym (#PCDATA)>
]>
```

The signature is shown in FIG. 4A as follows:

```
<signature>
    <name> CarType </name>
    <field key= "true">
        <name> Make </name>
        <synonym> *carmake* </synonym>
    </field>
    <field key= "false">
        <name> Model </name>
    </field>
    <field key= "false">
        <name> Year </name>
    </field>
    <field key= "false">
        <name> Interior </name>
    </field>
    <field key= "false">
        <name> Type </name>
    </field>
</signature>
```

Profiles are shown in FIG. 4B as follows:

```
<profile>
    <name> HondaCivicSedan </name>
    <signature> CarType </signature>
    <fieldvalue>
        <name> Make </name>
        <regexp> Honda </regexp>
    </fieldvalue>
    <fieldvalue>
        <name> Model </name>
        <regexp> *Civic*Sedan* </regexp>
    </fieldvalue>
    <fieldvalue>
        <name> Year </name>
        <regexp> 1999|2000 </regexp>
    </fieldvalue>
    <fieldvalue>
        <name> Interior </name>
        <regexp> Beige </regexp>
    </fieldvalue>
    <fieldvalue>
        <name> Type </name>
        <regexp> Sedan </regexp>
    </fieldvalue>
</profile>
<profile>
    <name> Rolls </name>
    <signature> CarType </signature>
    <fieldvalue>
        <name> Make </name>
        <regexp> Rolls-Royce </regexp>
    </fieldvalue>
    <fieldvalue>
        <name> Model </name>
```

-continued

```
        <regexp> *Corniche* </regexp>
      </fieldvalue>
      <fieldvalue>
        <name> Year </name>
        <regexp> 2002 </regexp>
      </fieldvalue>
      <fieldvalue>
        <name> Type </name>
        <regexp> Convertible* </regexp>
      </fieldvalue>
</profile>
```

The process of finding choices followed by the ChoiceFinder 108 and guided by the SmartProfiles is illustrated in the flow chart of FIG. 5. The search for actions is done in a hierarchical fashion. First-level actions correspond to links, active elements (e.g., buttons with onclick handlers), and forms present in a page. ChoiceFinder 108 enumerates these actions and, in one embodiment of the invention, it uses VeriSoft 110 to select one of these actions. The process is begun in 501. Input 503 supplies as an input, a new page retrieved by the Web Navigator 105, which is done before the process is started. Actions in the selected page are enumerated in step 502. Thereafter, in step 504 VeriSoft 110 selects an action. If the action selected by VeriSoft 110 is a link or a simple active element, the chosen action is returned to the Web Navigator 105 for execution (i.e., load a new page that corresponds to the URL in the selected link, or execute the function associated with the onclick handler if the selected action is a button). The execution of actions is further described below. Otherwise, if the action selected via VeriSoft 110 is a form, a more complex process is required in order to decide how to fill out the form. The process to generate an action for a given form has three main steps: form analysis 508, form matching 509 in conjunction with input 510, and Select Match 511 in conjunction with input 512.

The form analysis step 508 processes the HTML form and generates a form schema. The form schema (FS) is an abstraction of an HTML form and stores the name and type of each element of the form and, for constrained fields, all the possible values. Step 509, Form Matching Process, employs SmartProfiles and an active profile list to generate a set of possible matches 512.

Given a form schema FS selected in a testing scenario, the goal of the Select Match process 511 is to identify in the SmartProfiles repository 109, SmartProfiles that can be used to fill out FS. The form schema to profile matching for generating choices is a two step process: first, find a signature (or set of signatures) that matches the given form schema; and then select the profile (or profiles) associated with the selected signature (or signatures).

In an embodiment of VeriWeb, a signature is said to match a form schema if all the key fields defined in the signature are present in the form schema. (Other matching strategies are possible, e.g., matching two distinct signatures with a single form.)

If a signature (or set of signatures) S matches the form schema FS, all profiles that correspond to the matching signatures are candidates to provide values to fill out the form. Since, there can be a huge number of choices, VeriWeb supports different profile selection policies. In the current embodiment of this invention, one policy is to select a profile P that corresponds to the selected signature has previously been used in this scenario and use P to generate the candidate form completions. If no such profile exists, all the profiles corresponding to the matching signatures are used to generate the completions. Other profile selection policies can be defined by the tester. These completions are then non-deterministically selected by VeriSoft.

Note that profile policies (search constraints) are enforced by the Select Match process 511. Then, Form Match Process 511 supplies a particular match to Find Completions step 513. Many different strategies can be used to select SmartProfiles, and different kinds of search constraints can be defined. Below we describe the strategy and constraints we have implemented in VeriWeb as an example.

If none of the signatures matches the form schema (4), user input may be required: if that form is relevant to the testing process, the tester must create a signature and profiles so that the form can be automatically filled and submitted. In this example, this is done by writing to a log, information about the unknown form (its form schema), as well as, the navigation sequence used to reach the page where the unknown form is located (the latter information is useful for the tester to locate the actual form).

Note that no matter how sophisticated the page analysis is, additional information may sometimes be required from the tester in order to perform form matching. For this purpose, VeriWeb includes an interactive profile refinement iterative process where the tester is prompted for specific missing information. For instance, the tester may be asked to define a name for an unknown form field, or to provide a synonym for a signature name that is not matched with any form field. This additional information is then recorded as part of a new SmartProfile. An advantage of this process is that information gathering is driven by the needs of the test engine to carry out Web-site exploration: the tester is not required to navigate the site. Iterations of this process allow the test engine to accumulate large synonym lists for a given profile field for use in subsequent exploration, and these lists may remain valid even when the order of the pages or the order of the fields within forms is modified.

The output of Select Matching step 511 is a set of profiles, i.e., partial matches (5), that can be used to fill out the selected form. Find Completions step 513 takes these profiles and generates the possible completions, i.e., all the different ways of using the values in selected profiles to fill out the form. Filling out each element of the form schema requires searching of the synonym list that matches the element name, and then again comparing that synonym list against the name in the profile to fetch the value used to fill the element. Additionally, if the field to be filled is a constrained field then the values in the profile need to be matched against values of the constrained field in the form. VeriSoft 110 is used in the select completions step 515 to select one of these completions. And the completion selected by VeriSoft is returned to the Web Navigator 105 via step 506 for execution (i.e., form submission). Thereafter, the process is stopped via step 507.

VeriSoft

The control and management of the search process is performed using an existing tool, VeriSoft 110. VeriSoft 110 is a tool for systematically exploring the state spaces of software systems that may be composed of several concurrent processes. The state space of a system is defined as a directed graph that represents the combined behavior of all the components of the system being tested. Paths in this graph correspond to sequences of operations (scenarios) that can be observed during executions of the system. VeriSoft 110 systematically explores the state space of a system by controlling and observing the execution of all the components, and by re-initializing their executions. VeriSoft 110 can always guarantee complete coverage of the state space up to some depth.

Whenever an error is detected during state-space exploration, a scenario leading to the error state is saved in a file. Scenarios can then be executed and replayed by the user with an interactive graphical simulator. In the context of VeriWeb, the system being tested is a Web site and it is viewed as a single process by VeriSoft 110. The state space of the Web site is defined by the set of Web pages (statically or dynamically generated) in the site that can be reached from some initial page, given a SmartProfile repository 109. Reachable pages are the states of the Web-site state space, while the set of possible actions from a given page determined by ChoiceFinder 108 defines the set of transitions from the corresponding state. Regarding VeriSoft, see an article authored by P. I. Godefroid entitled "Model Checking for Programming Languages using VeriSoft", *In ACM Symposium on Principles of Programming Languages*, pages 174-186, January 1997, and U.S. Pat. No. 6,102,968, issued to C. Colby, P. I. Godefoid and L. J. Jagadeesan on Aug. 15, 2000. Also see http://www.bell-labs.com/projects/verisoft.

Systematic State-Space Exploration

The ExploreSite procedure shown below in pseudo code and shown in the flow chart of FIG. 6 describes a nondeterministic process, which is executed under the control of VeriSoft 110 for systematically, exhaustively exploring, i.e., considering, all possible sequences of actions identified by recursive calls to ChoiceFinder 108. Starting from a predefined URL (starting URL, lines 1, 2, 3), the process explores execution paths in the state space reachable from that starting page. Each visited page is checked for errors using the component of VeriWeb called Error Handler 107 (line 5); if an error is detected, the error is logged by VeriSoft 110 for later inspection (by invoking VeriSoft.assert in line 7). (Error handling is discussed below.) If a cycle, i.e., the page has been seen before, is detected (line 8), the exploration of possible actions from the current page is aborted by invoking VeriSoft.abort (line 9). Otherwise, the search proceeds by invoking ChoiceFinder 108 (line 11) to compute the set of possible actions from the current page. One of these actions is nondeterministically selected by VeriSoft 110 (VeriSoft.toss in line 12) as explained below. The selected action is then executed (line 13) by the Web Navigator 105 and described above. If an error occurs during action execution, an error is reported (line 14-15). Otherwise, the same procedure is repeated from the page returned by the Web Navigator 105.

```
1 ExploreSite(startingURL,constraints)
2 // Start a new scenario
3 currentPage = Navigator.load(startingURL);
4 while (true) {
5    error = ErrorHandler(currentPage,constraints);
6    if (error.status==true)
7       VeriSoft.assert(currentPage,error);
8    if (this page has been seen before)
9       VeriSoft.abort(currentPage,"cycle");
10   else {
11      choices = ChoiceFinder(currentPage);
12      selectedChoice = VeriSoft.toss(|choices|_1);
13      currentPage =
         Navigator.execute(selectedChoice,choices);
14      if (currentPage.error != null)
15         VeriSoft.assert(currentPage,error);
16   }
17 }
```

The execution of the above nondeterministic ExploreSite process is controlled by VeriSoft 110. The special function VeriSoft.toss, provided by VeriSoftI 110 to simulate nondeterminism, takes as argument a positive integer n, and returns an integer in [0; n]. The function is nondeterministic: the execution of VeriSoft.toss(n) may yield up to n+1 different successor states, corresponding to different values returned by VeriSoft.toss. By controlling the value to be returned for each call to VeriSoft.toss, VeriSoft 110 can drive the state-space exploration along a specific execution path. VeriSoft 110 also forces the termination of the execution of the ExploreSite process when a certain depth is reached. This maximum depth is specified by the tester via one of the several parameters that can be used to control the state-space search performed by VeriSoft 110, and is measured here by the number of calls to VeriSoft.toss executed so far in the current run of the algorithm.

Every run of ExploreSite traverses a sequence of Web pages, i.e., one path in the state space of the Web site. By controlling the value to be returned for each call to VeriSoft.toss, and by repeatedly executing ExploreSite with different sequences of such values, VeriSoft 110 systematically explores the state space of the site being tested. VeriSoft 110 supports several search strategies (such as depth-first search up to some maximum depth, iterative deepening, randomized search, etc.). Note that, in the case of Web sites where transactions (i.e., "write" operations) can be performed during execution paths, we assume that the state of the Web site can be reset to some unique initial value using some application-specific procedure that can be invoked between runs of ExploreSite. In order to reset the state of the client side (browser), cookies are removed between runs of ExploreSite.

Figure 6:
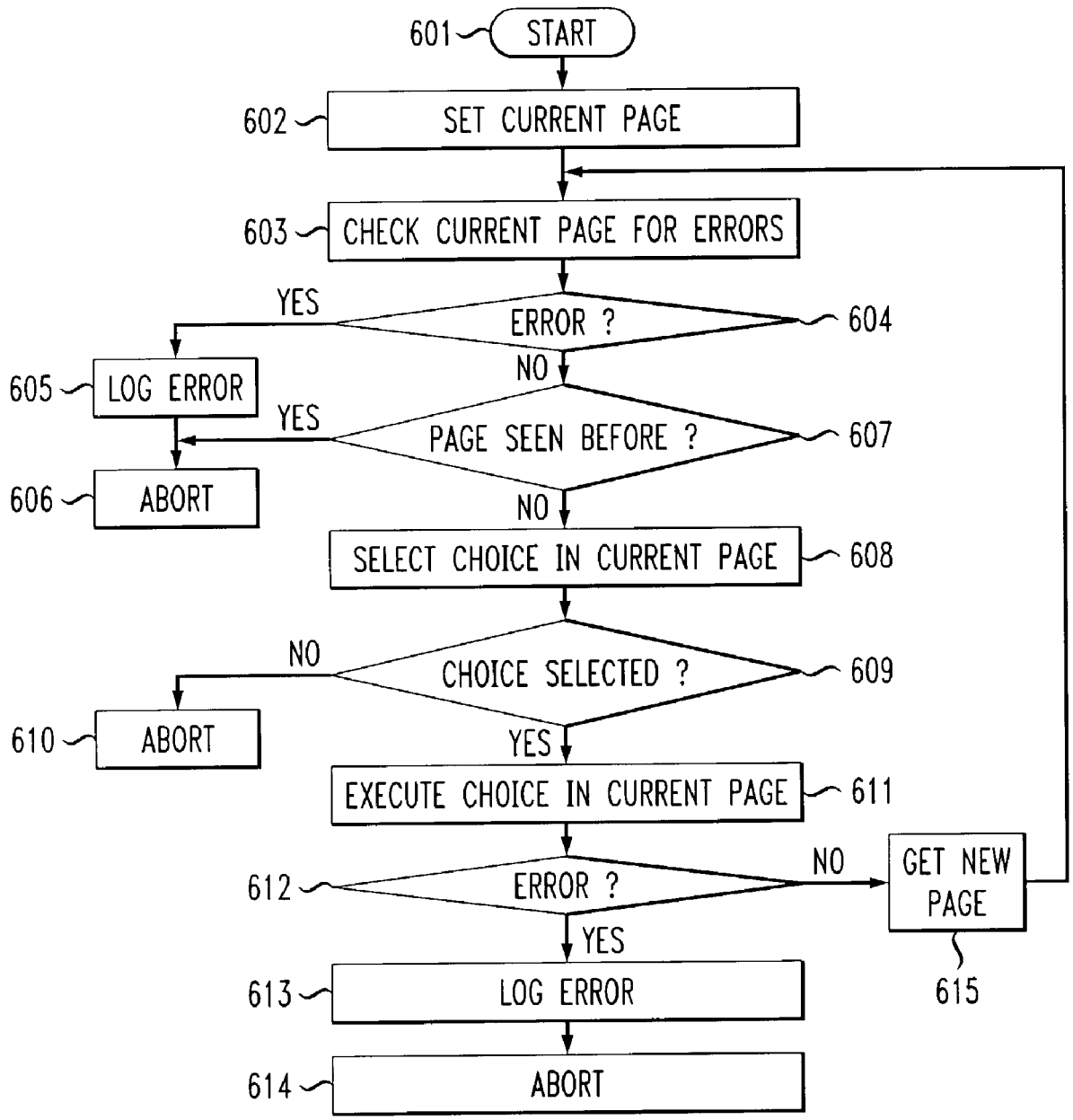
FIG. 6 is a flowchart showing steps in the explore scenario process in accordance with the invention.

FIG. 6 illustrates a flow chart showing steps in the process described by the ExploreSite pseudo code above. The Explore scenario is begun in start step 601. Then, step 602 sets, i.e., obtains, a current page and step 603 checks it for errors again using Error Handler 107. Step 604 tests whether an error has been detected. If the test result in step 604 is YES, the error is logged in step 605 and the ExploreSite process is aborted in step 606. If the test result in step 604 is NO, step 607 tests whether the current page has been seen before. If the test result in step 607 is YES, the ExploreSite process is aborted in step 606 to avoid going into cycles. If the test result in step 607 is NO, step 608 (executed by the ChoiceFinder 108) selects a choice in the current page and, then, step 609 tests to determine if a valid choice has been selected. Note that in order to stop the search VeriSoft 110 may instruct ChoiceFinder 108 not to select any choice in the current page. If the test result in step 609 is NO, the ExploreSite process is aborted in step 610. If the test result in step 609 is YES, step 611 executes the selected choice in the current page. Step 612 tests to determine whether there is an error in the execution of the choice. If the test result in step 612 is YES, there is an error, the error is logged in step 613 and the ExploreSite process is aborted in step 614. If the test result in step 612 is NO, the newly obtained page is retrieved in step 615. Thereafter, appropriate ones of steps 603 through 615 are iterated.

Pruning Strategies

Clearly, the state space of a Web site can be huge, even infinite. Therefore, it is often necessary in practice to limit the size of the state space using various techniques. One obvious cause of "state explosion" is the astronomical number of ways most forms can be filled in. For example, ignoring Keywords, there are 2,116 different ways to fill in the Yahoo Auto Classifieds form of FIGS. 2A and 2B. VeriWeb is designed to support a variety of strategies to deal with this issue. The level of pruning can be tuned by defining SmartProfiles and profile policies (search constraints), as described above. In addition, simple pruning techniques used in standard crawlers can also be applied such as restricting the search by not following URLs outside of a set of domains, eliminating links that match some pre-defined set of regular expressions (e.g., mail: *, *.ps, *doubleclick*), and setting a limit on the number of links to be followed in each page. Other sources of inefficiency in the search are cyclic paths. For example, in the Travelocity site, all pages have a Home link that points to the main page; thus, if all links are explored in all visited pages, the main page will be visited many times. A possible optimization is to record visited URLs and prevent the search from exploring successors from the same URL more than once. However, for dynamic sites, applying this optimization is not always straightforward. For example, sites that generate pages dynamically may generate different links to the same content—different servers can be used for load balancing, or different session ids may be appended to links. For instance, in the Travelocity site, every Home link is of the form:

<a
href="http://dps1.travelocity.com:80/
  glblwhere.ctl?go_to_ctl=HOME&
  go=HOME&SEQ=100567877705164111132001&
  LANG=EN&
  last_pgd_page=logngstexp.pgd">Home</a>

Since the session id SEQ embedded in the link may change after some period of time, recording the HREF is not enough to avoid revisiting the main page during site exploration. Even when previously visited pages can be detected, eliminating them may be undesirable. For example, in Travelocity, depending on the exploration context, clicking on the Flights link may lead to different pages, namely to the login page if this is the first visit, or to the flight search page if the browser already contains a cookie. Thus, disregarding the Flights link the second time around will in effect prevent the exploration of a new, previously unexplored path. Similarly, for personalized sites, clicking on a particular link may lead to different content, depending on the user browsing the site. Detecting cycles (as done in line 8 of the ExploreSite process) may be more or less important depending on the specific Web site being tested. In one embodiment of the invention, cycle detection is not utilized, and VeriSoft 110 is relied on to limit the depth of the search and guarantee the termination of the search process.

Execution

Actions selected during site exploration are executed by the Web Navigator. The Web Navigator mimics closely what a user would do while interacting with a browser—the test scenarios are thus realistic simulations of user interactions. In fact, the disclosed embodiment uses a standard browser to perform the exploration. Note that it is also possible to implement the Navigator 105 using freely available HTTP libraries, DOM interfaces and JavaScript interpreters. We opted to use existing browsers not only because it simplifies the implementation, but also because it allows the detection of errors that may be specific to a particular browser. The Web Navigator differs from traditional crawlers in the way it treats pages that contain forms and client-side scripts. After ChoiceFinder 108 analyzes a page and an action is selected, it instructs the Navigator 105 to execute the selected action. The execution of an action follows the standards defined for HTML and ECMAscript.

Given a link, the location of the browser is set to the HREF of the link (effectively loading the HREF); if the link has an onClick event handler, the handler is invoked and the location of the browser is set to the HREF of the link only if the handler returns true.

Given a form, the values selected by the ChoiceFinder are set, the onSubmit handler (if any) is invoked, and the form is submitted.

Given an active form element, its associated event handler is invoked.

Error Handling

Two broad classes of errors are detected by VeriWeb: navigation errors and page errors. Navigation (or execution) errors are detected by the Web Navigator 105, and include failure in retrieving a Web page (e.g., page not found) and unsuccessful form submission (e.g., onSubmit handler returns false). Page errors are detected by the Error Handler component 107 of VeriWeb, which can check various properties on visited Web pages. For example, pages can be analyzed using weblint, or checked against accessibility guidelines. They can also be "grepped" for strings that identify application specific errors (e.g., "cannot connect to database", "invalid customer") or for constraints that must hold throughout the Web site (e.g., all pages must contain a navigation bar). More complex graph-theoretic properties involving arbitrary sequences or trees of Web pages (e.g., constraints on frame combinations) could also be specified and checked, along the same lines as the verification of temporal properties of state spaces using model checking. VeriWeb is implemented in a modular way so that various existing checking modules can easily be invoked from the Error Handler 107.

Error logging is performed at three different levels: by VeriSoft 110 (error traces), by the Navigator 105 (SmartBookmarks), and by the Web Proxy (Cache of pages retrieved).

Whenever an error is detected during Web-site exploration, a scenario (i.e., a sequence of VeriSoft.toss values defining a state-space path from the starting page) is saved by VeriSoft 110 in a file. These scenarios can be visualized and replayed interactively by the tester for debugging purposes. In addition to the diagnosis information recorded by VeriSoft 110, the Web Navigator 105 itself can optionally save a richer representation of scenarios leading to errors. These scenarios are saved in the SmartTraces repository 106 as SmartBookmarks and can be replayed by theWebVCR. TheWebVCR provides a VCR-style interface to transparently record and replay users' browsing actions. This feature makes it possible to replay sequences of actions over Web pages that can change from one testing session to the next. In contrast to capture-replay tools such as e-tester whose scenarios cannot be replayed if minor changes are applied to the Web site (since they refer to links and forms by their DOM address), SmartBookmarks use a more robust representation and can be correctly replayed even in the presence of structural changes in the underlying Web pages.

During site exploration, testers can also choose to cache all visited pages, or visited pages in scenarios that lead to errors. Caching these pages allows testers to inspect transient errors (e.g., a database that was temporarily unreachable). Caching pages also allows offline error detection, i.e., apply the Error Handler 107 checks over the cached pages; however, since some pages may be created by scripts as they are loaded in the browser, analyzing cached pages may cause errors to be missed.

The foregoing merely illustrates the principles of the invention. It will be appreciated that a person skilled in the art can readily devise numerous other systems, which embody the principles of the invention and, therefore, are within its spirit and scope.

What is claimed:

1. A method for use in the exploration and testing of Web sites including the steps of:
    systematically exploring a dynamic Web site, said Web site including one or more dynamically generated Web pages; including
    determining possible user actions that may be performed in a Web page,
    determining if any of said user actions correspond to at least one form,
    if so, automatically generating user values to populate said at least one form,
    automatically and systematically executing said determined user actions, and
    testing results of said execution for errors;
    wherein said step of automatically generating user values to populate said at least one form further comprises:
    determining a form schema;
    identifying at least one signature that matches the determined form schema;
    selecting one or more predetermined profiles associated with the identified signature(s);
    utilizing the selected predetermined profile(s) to generate one or more candidate form completions; and
    utilizing said candidate form completion(s) to provide said user values;
    the method further including initializing exploration from a predetermined initial uniform resource locator (URL), discovering and executing user actions, storing said executed user actions, storing states that have been explored, detecting when either a prescribed state space depth is reached or that an error has been detected, and as a result of said detecting, re-initializing said exploration from said predetermined initial URL.

2. A method for use in the exploration and testing of Web sites including the steps of:
    systematically exploring a dynamic Web site, said Web site including one or more dynamically generated Web pages; including
    determining possible user actions that may be performed in a Web page,
    determining if any of said user actions correspond to at least one form,
    if so, automatically generating user values to populate said at least one form,
    automatically and systematically executing said determined user actions, and
    testing results of said execution for errors;
    wherein said step of automatically generating user values to populate said at least one form further comprises:
    determining a form schema;
    identifying at least one signature that matches the determined form schema;
    selecting one or more predetermined profiles associated with the identified signature(s);
    utilizing the selected predetermined profile(s) to generate one or more candidate form completions; and
    utilizing said candidate form completion(s) to provide said user values;
    wherein said step of automatically generating user values includes performing a form analysis to generate a form schema, employing said form schema and profiles from an active profile list to match said form to a data model and to generate a set of partial matches, selecting a match from said set of partial matches, for said selected match generating a set of completions, and selecting a completion from said set, thereby completing said form.

3. A method for use in the exploration and testing of Web sites including the steps of:
    systematically exploring a dynamic Web site, said Web site including one or more dynamically generated Web pages; including
    determining possible user actions that may be performed in a Web page,
    determining if any of said user actions correspond to at least one form,
    if so, automatically generating user values to populate said at least one form,
    automatically and systematically executing said determined user actions, and
    testing results of said execution for errors;
    wherein said step of automatically generating user values to populate said at least one form further comprises:
    determining a form schema;
    identifying at least one signature that matches the determined form schema;
    selecting one or more predetermined profiles associated with the identified signature(s);
    utilizing the selected predetermined profile(s) to generate one or more candidate form completions; and
    utilizing said candidate form completion(s) to provide said user values;
    wherein when an error is detected while exploring a Web site a scenario defining a state-space path from an initial Web page to the error is stored for later use as desired.

4. The method as defined in claim 3 wherein said error is a navigation error and/or a page error.

* * * * *